(12) United States Patent
Hashimoto et al.

(10) Patent No.: US 12,392,632 B2
(45) Date of Patent: Aug. 19, 2025

(54) INFORMATION PROCESSING DEVICE, INFORMATION PROCESSING SYSTEM, INFORMATION PROCESSING METHOD, AND NON-TRANSITORY STORAGE MEDIUM STORING INFORMATION PROCESSING PROGRAM

(71) Applicant: TOYOTA JIDOSHA KABUSHIKI KAISHA, Toyota (JP)

(72) Inventors: Osami Hashimoto, Mishima (JP); Hiroki Tashima, Fujisawa (JP); Toshihiko Inoue, Nagoya (JP); Kazuma Toya, Anjyo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/539,998

(22) Filed: Dec. 14, 2023

(65) Prior Publication Data

US 2024/0230360 A1 Jul. 11, 2024

(30) Foreign Application Priority Data

Jan. 10, 2023 (JP) .................................. 2023-001995

(51) Int. Cl.
| | |
|---|---|
| *G01C 21/36* | (2006.01) |
| *G01C 21/34* | (2006.01) |
| *G06Q 30/0207* | (2023.01) |
| *G06T 7/70* | (2017.01) |
| *G06V 20/13* | (2022.01) |

(52) U.S. Cl.
CPC ..... *G01C 21/3679* (2013.01); *G01C 21/3469* (2013.01); *G06T 7/70* (2017.01); *G06V 20/13* (2022.01); *G06Q 30/0207* (2013.01); *G06T 2207/10032* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 10,585,431 | B2* | 3/2020 | Golgiri | H04W 4/021 |
| 11,062,156 | B1* | 7/2021 | Vallance | G06V 20/588 |
| 11,170,236 | B2* | 11/2021 | Adelsberger | G06F 18/22 |
| 11,836,131 | B1* | 12/2023 | Gronowski | G01C 21/3841 |
| 11,948,330 | B2* | 4/2024 | Last | G06V 20/54 |
| 2003/0191581 | A1* | 10/2003 | Ukai | G06Q 40/08 |
| | | | | 340/988 |

(Continued)

FOREIGN PATENT DOCUMENTS

| | | | |
|---|---|---|---|
| JP | 2010-161912 A | 7/2010 | |
| WO | WO-2018229750 A1 * | 12/2018 | G06K 9/00785 |

*Primary Examiner* — Ajay M Bhatia
(74) *Attorney, Agent, or Firm* — Dinsmore & Shohl LLP (57) ABSTRACT

An information processing device comprising a processor, wherein the processor is configured to: acquire a satellite image from an artificial satellite; detect, among charging stations within the satellite image that include at least one charger for a vehicle, vacant charging stations having a vacant charger that is not being used; and output station position information related to a position of each respective detected vacant charging station.

14 Claims, 6 Drawing Sheets

(56) References Cited

U.S. PATENT DOCUMENTS

| | | | |
|---|---|---|---|
| 2009/0085773 A1* | 4/2009 | Sin | G08G 1/14 |
| | | | 340/932.2 |
| 2013/0261953 A1* | 10/2013 | Kiyama | G01C 21/3469 |
| | | | 701/400 |
| 2017/0124378 A1* | 5/2017 | High | G06V 20/52 |
| 2018/0128638 A1* | 5/2018 | Lei | G08G 1/143 |
| 2020/0051431 A1* | 2/2020 | Kapadia | G06V 20/52 |
| 2020/0126322 A1* | 4/2020 | Kimura | G06F 16/29 |
| 2020/0211071 A1* | 7/2020 | Rosas-Maxemin | |
| | | | G06Q 30/0284 |
| 2020/0219019 A1* | 7/2020 | Choi | G06Q 10/02 |
| 2020/0349617 A1* | 11/2020 | Rosas-Maxemin | G06N 20/00 |
| 2021/0158703 A1* | 5/2021 | Uenoyama | G08G 1/143 |
| 2022/0114893 A1* | 4/2022 | Kim | G08G 1/143 |
| 2022/0307860 A1* | 9/2022 | Okuma | G01C 21/3837 |
| 2022/0383543 A1* | 12/2022 | Hetrich | G06T 7/593 |
| 2024/0118100 A1* | 4/2024 | Miyata | B60W 50/14 |
| 2024/0230360 A1* | 7/2024 | Hashimoto | G01C 21/3679 |
| 2024/0293938 A1* | 9/2024 | Zimmerman | G06V 20/50 |
| 2024/0318975 A1* | 9/2024 | Yamada | G01C 21/3697 |
| 2024/0404405 A1* | 12/2024 | Hüger | G01C 21/3807 |
| 2024/0424932 A1* | 12/2024 | Farkas | B60L 53/37 |
| 2025/0139621 A1* | 5/2025 | Rosas-Maxemin | |
| | | | G06Q 20/401 |
| 2025/0142206 A1* | 5/2025 | Umeda | H04N 23/66 |
| 2025/0168499 A1* | 5/2025 | Urasawa | H04N 7/18 |

* cited by examiner

INFORMATION PROCESSING DEVICE, INFORMATION PROCESSING SYSTEM, INFORMATION PROCESSING METHOD, AND NON-TRANSITORY STORAGE MEDIUM STORING INFORMATION PROCESSING PROGRAM

CROSS-REFERENCE TO RELATED APPLICATION

This application is based on and claims priority under 35 USC 119 from Japanese Patent Application No. 2023-001995 filed on Jan. 10, 2023, the disclosure of which is incorporated by reference herein.

BACKGROUND

Technical Field

The present disclosure relates to an information processing device, an information processing system, an information processing method, and a non-transitory storage medium storing an information processing program.

Related Art

Japanese Patent Application Laid-Open (JP-A) No. 2010-161912 discloses a charging station that includes plural chargers for supplying power to an electric vehicle, and a charging guidance device that informs a user of a vacancy state of a charger and, in a case in which the charger is in use, of a required time until completion of charging. The user can understand which charger is vacant or which charger has less waiting time in a case in which the charger is not vacant, by looking at the display of the display unit of the charging guidance device.

However, the technology described in Japanese Patent Application Laid-Open (JP-A) No. 2010-161912 displays the state of use of each charger at a single charging station, and the state of use of each charging station cannot be understood before the user's vehicle enters the charging station.

The present disclosure provides an information processing device, an information processing system, an information processing method, and a non-transitory storage medium storing an information processing program, which are capable of informing a user of position information of each respective vacant vehicle charging station.

SUMMARY

An information processing device comprising: a satellite image acquisition section that is configured to acquire a satellite image from an artificial satellite; a detection section that is configured to detect, among charging stations including at least one charger for a vehicle, vacant charging stations with a vacant charger, which is not being used, from the acquired satellite image; and an output section that is configured to output station position information related to a position of each respective detected vacant charging station.

According to the information processing device of the first aspect, the satellite image acquisition section acquires a satellite image from an artificial satellite. Moreover, the detection section detects, among charging stations appearing in the satellite image, vacant charging stations having a vacant charger that is not being used. Moreover, the output section outputs station position information of each respective detected vacant charging station to the vehicle. This enables a user to understand the position each respective vacant charging station with a vacant charger. Note that detection of vacant charging stations may be performed using, for example, machine learning.

An information processing device according to a second aspect is the information processing device according to the first aspect, further including: a vehicle information acquisition section that is configured to acquire vehicle information relating to a remaining amount of power of a vehicle and a current position of the vehicle; and an identifying section that is configured to identify, based on the vehicle information, a vacant charging station that the vehicle can reach, among the vacant charging stations, wherein the output section is configured to output station position information related to the vacant charging station identified by the identifying section.

According to the information processing device of the second aspect, the vehicle information acquisition section acquires vehicle information relating to the remaining amount of power of the vehicle and the current position of the vehicle. Moreover, based on the vehicle information, the identifying section identifies a charging station that the vehicle can reach from among the vacant charging stations. The output section then outputs the position information related to the vacant charging station identified by the identifying section. This enables a situation in which the remaining amount of power of the vehicle is used up before reaching the charging station to be avoided. Note that identification of a vacant charging station that the vehicle can reach may be performed using, for example, machine learning.

An information processing device according to a third aspect is the information processing device according to the second aspect, further including: a calculation section that is configured to calculate, based on the satellite image, a number of vacant chargers at each respective vacant charging station, wherein the output section is configured to preferentially output station position information related to each of a predetermined number of vacant charging stations that have a largest or next largest number of vacant chargers.

According to the information processing device of the third aspect, the calculation section calculates the number of vacant chargers at each respective charging station based on the satellite image. The output section then preferentially outputs position information related to each of a predetermined number of vacant charging stations that have a largest or next largest number of vacant chargers. This enables the user to understand the charging stations that are frequently vacant. This enables the possibility of the chargers of a charging station becoming filled while the vehicle is moving to the charging station to be reduced.

An information processing device according to a third aspect is the information processing device according to the second aspect, further including: a calculation section that is configured to calculate, based on the satellite image, a number of vacant chargers at each respective vacant charging station, wherein the output section is configured to preferentially output station position information related to each of the vacant charging stations that have at least a predetermined number of vacant chargers.

According to the information processing device of the third aspect, the calculation section calculates the number of vacant chargers at each respective charging station based on the satellite image. The output section then preferentially outputs position information related to each of the vacant charging stations that have at least a predetermined number of vacant chargers. This enables the user to understand the charging stations that are frequently vacant. This enables the possibility of the chargers of a charging station becoming filled while the vehicle is moving to the charging station to be reduced.

An information processing device according to a fifth aspect is the information processing device according to the third aspect, further including: a guidance section that is configured to guide the vehicle to a vacant charging station having a largest number of vacant chargers.

According to the information processing device of the fifth aspect, the guidance section guides the vehicle to the vacant charging station having a largest number of vacant chargers. This enables the charging of plural vehicles to be geographically dispersed.

An information processing system according to a sixth aspect includes: a vehicle that includes a display area inside a vehicle cabin; and the vehicle information processing device according to any one of the first aspect to the fourth aspect, which detects the vacant charging stations with a vacant charger from the satellite image that is captured by the artificial satellite, and which causes display of the station position information related to the position of each respective vacant charging station at the display area of the vehicle.

According to the information processing system of the sixth aspect, a satellite image is captured by an artificial satellite. Moreover, the satellite image acquisition section of the information processing device acquires the satellite image from the artificial satellite. Further, the detection section of the information processing device detects vacant charging stations with a vacant charger from among charging stations appearing in the satellite image. Moreover, the output section of the information processing device outputs the station position information of each respective vacant charging station to the display area of the vehicle. This enables the user to visually understand the position of charging stations with a vacant charger.

The information processing device according to the first aspect has an effect of enabling a user to be informed of the position information of each respective vacant vehicle charging station.

The information processing device according to the second aspect has an effect of enabling a user to be informed of the position information of a vacant charging station that the vehicle can reach.

The information processing device according to the third aspect and fourth aspect has an effect of enabling the possibility of a user waiting to be reduced.

The information processing device according to the fifth aspect has an effect of being able to stabilize power supply.

The information processing system according to the sixth aspect has an effect of enabling a user to be informed of the position information of each respective vacant vehicle charging station.

BRIEF DESCRIPTION OF THE DRAWINGS

An exemplary embodiment of the present disclosure will be described in detail based on the following figures, wherein.

DETAILED DESCRIPTION

Explanation follows regarding an information processing device according to an exemplary embodiment of the present disclosure, with reference to FIG. 1 to FIG. 6.

Figure 1:
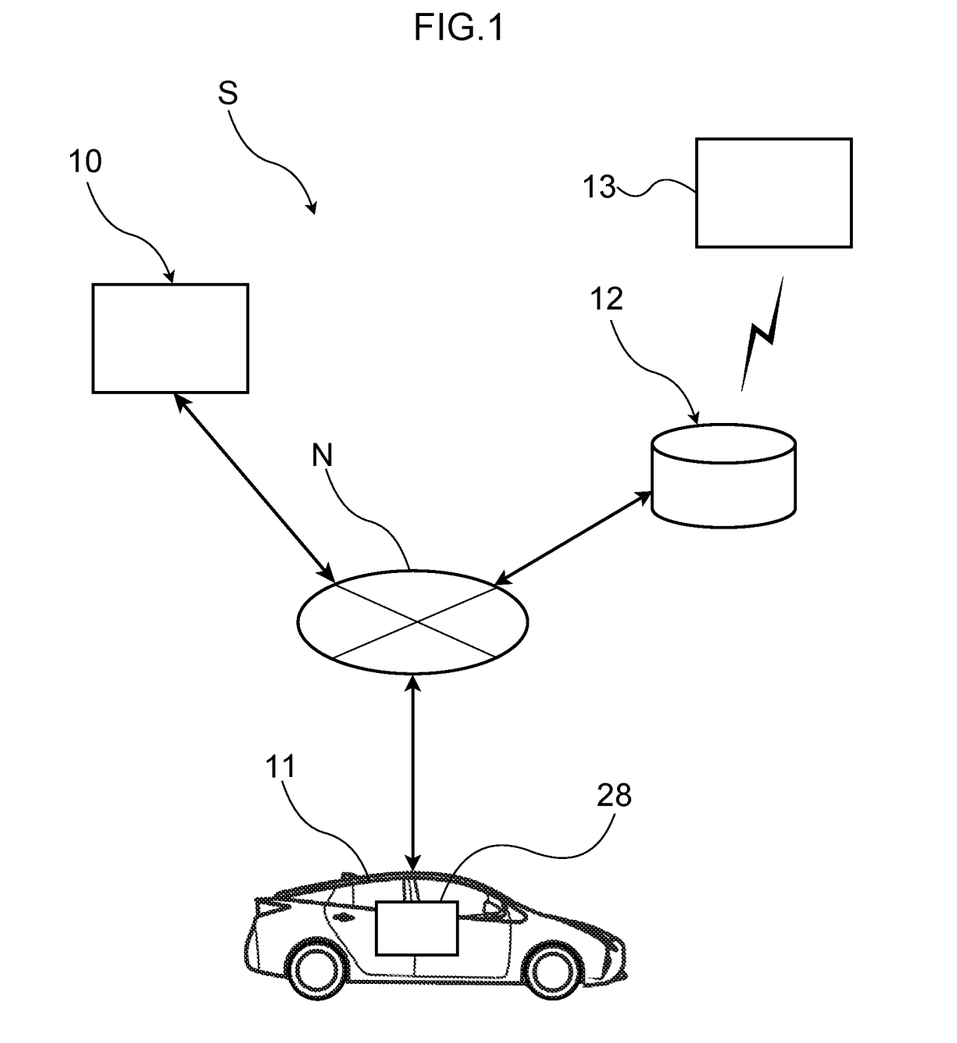
FIG. 1 is a schematic diagram illustrating an information processing system according to an exemplary embodiment of the present disclosure.

As illustrated in FIG. 1, an information processing system S according to the present exemplary embodiment includes an information processing device 10, a vehicle 11, and a server 12. The information processing device 10, the vehicle 11, and the server 12 are connected via a network N so as to be capable of communicating with each other. The vehicle 11 is, for example, a battery electric vehicle (BEV). Note that the network N is not limited to being connected to the vehicle 11, and other plural BEVs may be connected to the network N.

As an example, the information processing device 10 is installed outside the vehicle 11, and is configured so as to be capable of transmitting requested information in response to receiving an instruction from the vehicle 11. Moreover, the information processing device 10 is configured so as to be capable of acquiring various information from the server 12 via the network N. Note that the information processing device may be provided inside the vehicle.

As an example, the server 12 is installed outside the vehicle 11, and is configured so as to be capable of receiving data from an artificial satellite 13. Accordingly, the server 12 stores satellite images captured by the artificial satellite 13. Note that the server may be provided inside the vehicle.

The information processing device 10 according to the present exemplary embodiment is a device that detects charging stations (hereafter simply referred to as "vacant charging stations") including a vacant vehicle charger (hereafter simply referred to as a "vacant charger") from a satellite image captured by the artificial satellite 13, and outputs position information (hereafter simply referred to as "station position information") of the vacant charging stations to the vehicle 11. Note that illustration of a charger and a charging station is omitted.

Configuration of the Vehicle 11

Figure 2:
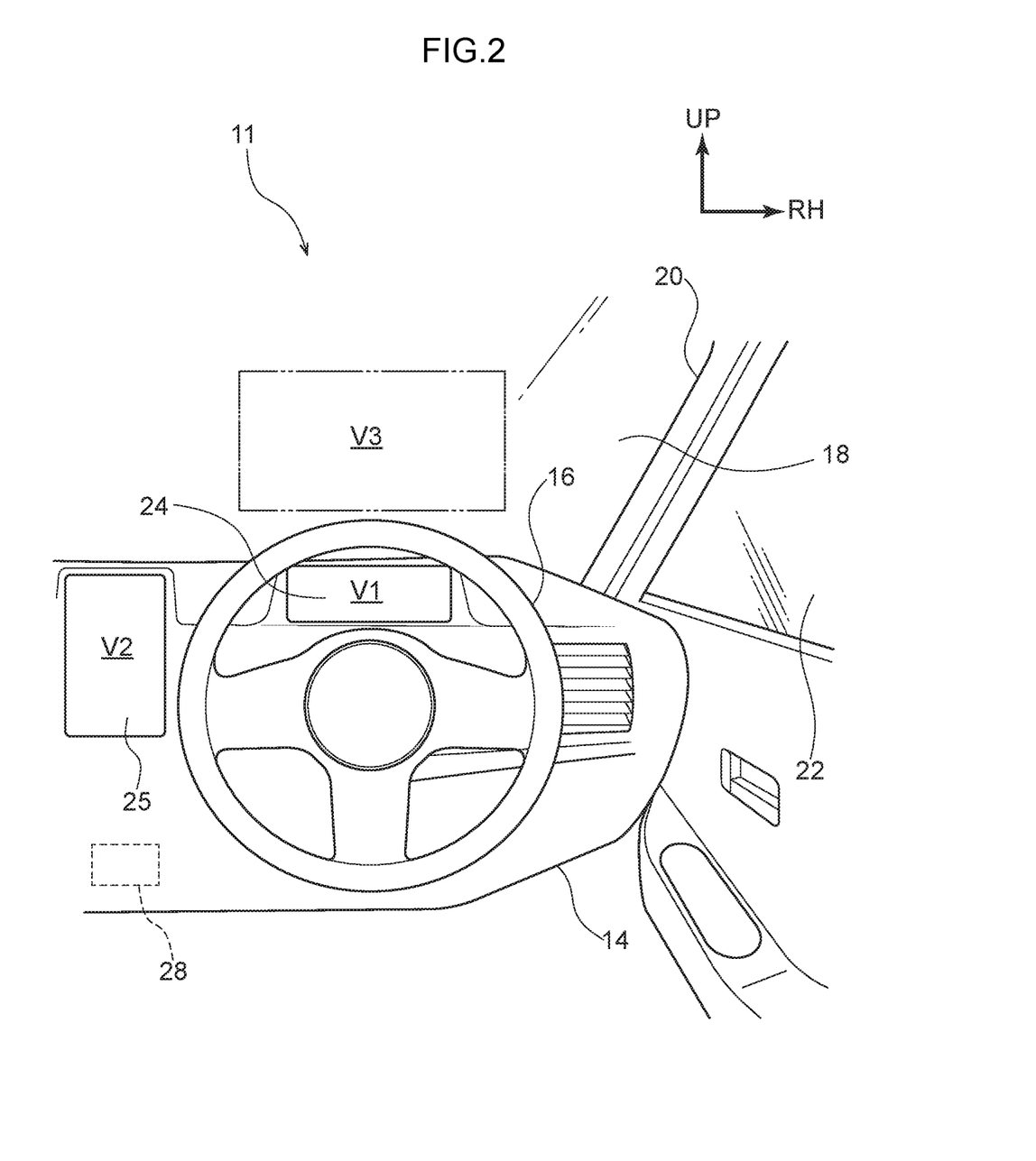
FIG. 2 is a schematic diagram illustrating a front part inside a vehicle cabin, viewed from a vehicle rearward side, of the vehicle illustrated in FIG. 1.

FIG. 2 is a schematic diagram illustrating a front part inside a vehicle cabin, viewed from a vehicle rearward side, of the vehicle 11. Note that the arrow UP illustrated in FIG. 2 indicates an upper side in a vehicle vertical direction, and the arrow RH indicates a right side in a vehicle width direction. The vertical direction and the left-right direction in the following explanation respectively mean the vertical direction in the vehicle vertical direction and the left-right direction in the vehicle width direction.

As illustrated in FIG. 2, an instrument panel 14 that extends in the vehicle width direction is provided at a front part inside a vehicle cabin of the vehicle 11. A steering wheel 16 is provided rearward of the instrument panel 14. The steering wheel 16 of the present exemplary embodiment is provided, for example, at a vehicle right side. Namely, the vehicle 11 is a right hand drive vehicle, and a driver's seat is installed on the right side of the vehicle. Note that the vehicle is not limited to a right hand drive vehicle, and may be a left hand drive vehicle in which the driver's seat is on the left side of the vehicle.

The instrument panel 14 is disposed at a vehicle lower side of a windshield glass 18. The windshield glass 18 is inclined downward towards a vehicle front side so as to partition the vehicle cabin interior from an exterior of the vehicle cabin.

A right side end part of the windshield glass 18 is fixed to a vehicle width direction inner side of a front pillar 20 on the vehicle right side, the front pillar 20 extending approximately in a vertical direction. Further, a front side glass 22 provided at the right side of the vehicle 11 is disposed at a vehicle rearward side of the front pillar 20. Although not illustrated in the drawings, a left side end part of the windshield glass 18 is fixed to a front pillar on the vehicle left side.

A meter display 24 serving as a first display device including a display area V1 of an image is provided facing the driver's seat, at an upper portion of the instrument panel 14. The meter display 24 is connected to various meter devices installed at the vehicle 11. The meter display 24 is provided at a position that enters a field of view of an occupant (hereinafter referred to as a "user") who is seated in the driver's seat of the vehicle 11 in a state in which the user has oriented their line of sight forward of the vehicle.

A center display 25 serving as a second display device including a display area V2 of an image is provided at a central portion of the instrument panel 14 in the vehicle width direction. The center display 25 is a component of a navigation system 54 (see FIG. 4), and is configured so as to be capable of displaying various information such as map information, position information of the vehicle 11, traffic information, route information, and the like as an image. The center display 25 also includes functionality as an input device, and is configured so as to be operable by the user or the like. As an example, the center display 25 is capable of touch operation and voice operation by the user or the like. Note that the center display may have no input functionality and only display functionality.

Moreover, the vehicle 11 includes a head-up display device (HUD) 56 (see FIG. 4, hereinafter referred to as "HUD 56") serving as a third display device that is capable of projecting an image on a display area V3. The HUD 56 is provided facing the driver's seat, at an upper portion of the instrument panel 14. The display area V3 is a projection plane on the windshield glass 18 ahead of the driver's seat.

Note that the vehicle 11 is provided with an onboard unit 28. The onboard unit 28 of the present exemplary embodiment is, for example, an electronic control unit (ECU) that performs various control.

Hardware Configuration of the Information Processing Device 10

Figure 3:
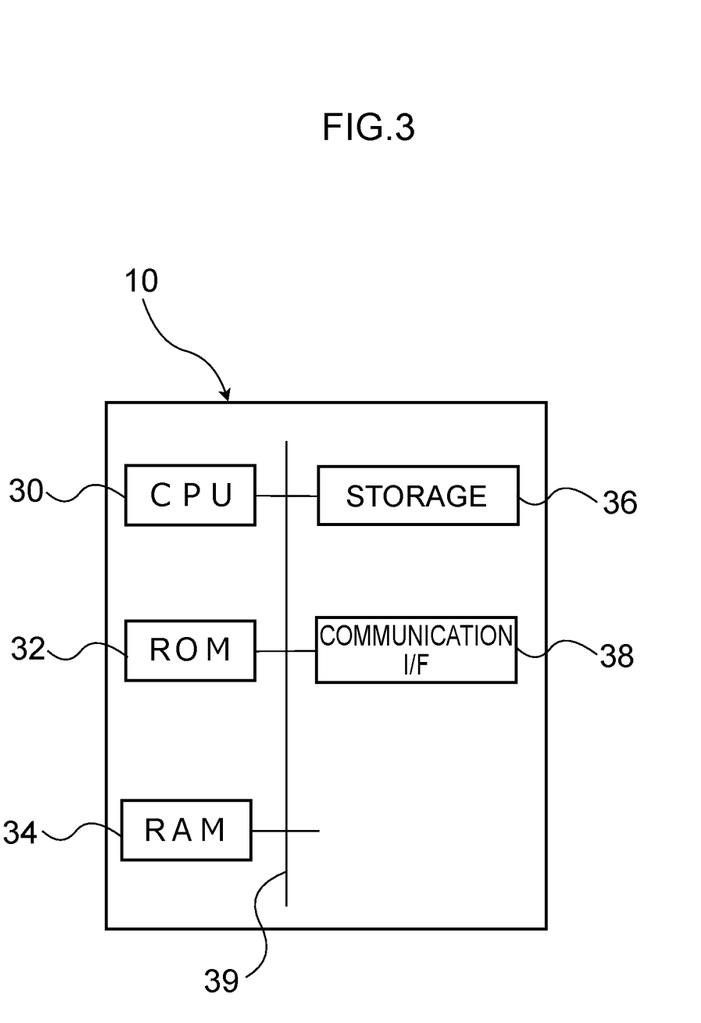
FIG. 3 is a block diagram illustrating a hardware configuration of the information processing device illustrated in FIG. 1.

As illustrated in FIG. 3, the information processing device 10 includes a central processing unit (CPU; serving as a processor) 30, read only memory (ROM) 32, random access memory (RAM) 34, storage 36, and a communication interface (communication I/F) 38. These respective configurations are communicably connected to each other via an internal bus 39.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory storage medium that stores various programs including an operating system, as well as various data. In the present exemplary embodiment, a display program or the like for performing display processing is stored in the ROM 32 or the storage 36.

The communication I/F 38 is an interface for the information processing device 10 to communicate with the server 12, the onboard unit 28, and other devices and, for example, a protocol such as a controller area network (CAN), Ethernet (registered trademark), long term evolution (LTE), a fiber distributed data interface (FDDI), or Wi-Fi (registered trademark) is used.

Hardware Configuration of the Vehicle 11

Figure 4:
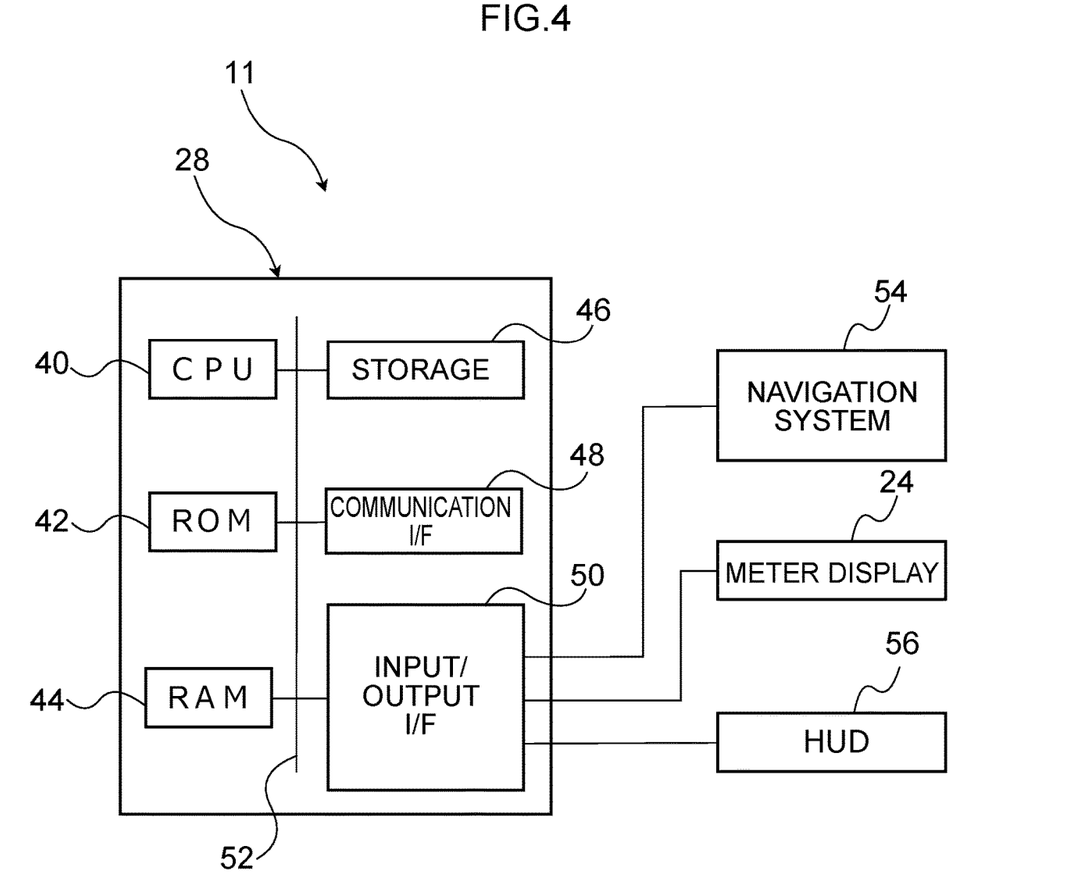
FIG. 4 is a block diagram illustrating a hardware configuration of the vehicle illustrated in FIG. 1.

As illustrated in FIG. 4, the onboard unit 28 includes a CPU 40, ROM 42, RAM 44, storage 46, a communication interface (communication I/F) 48, and an input/output interface (input/output I/F) 50. These respective configurations are communicably connected to each other via an internal bus 52.

The CPU 40 is a central processing unit that executes various programs and controls various components. Namely, the CPU 40 reads a program from the ROM 42 or the storage 46, and executes the program using the RAM 44 as a workspace. Further, the CPU 40 controls the respective configurations described above and performs a variety of computation processing in accordance with programs stored in the ROM 42 or the storage 46.

The ROM 42 stores various programs and various data. The RAM 44 serves as a workspace to temporarily store programs and data. The storage 46 is configured by an HDD or an SSD, and is a non-transitory storage medium that stores various programs including an operating system, as well as various data.

The communication I/F 48 is an interface for the onboard unit 28 to communicate with the server 12 and other devices and, for example, a protocol such as a controller area network (CAN), Ethernet (registered trademark), long term evolution (LTE), a fiber distributed data interface (FDDI), or Wi-Fi (registered trademark) is used.

The navigation system 54, the meter display 24, and the HUD 56 are connected to the input/output I/F 50.

The navigation system 54 stores map data in advance, and formulates a travel route to a set destination. The navigation system 54 also performs various guidance so as to enable the vehicle 11 to travel along a set travel route. The navigation system 54 causes display of an image at the display area V2 of the center display 25.

Functional Configuration of the Information Processing Device 10

Figure 5:
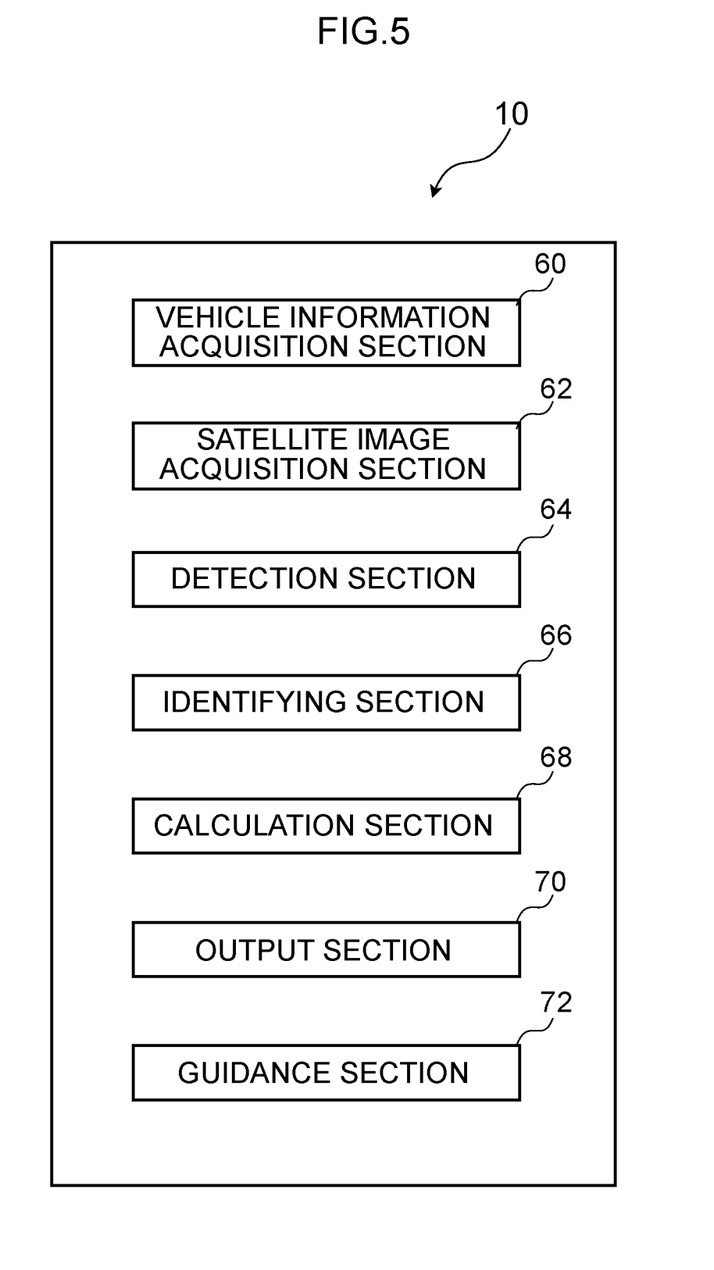
FIG. 5 is a block diagram illustrating a functional configuration of the information processing device illustrated in FIG. 3.

The information processing device 10 implements various functions using the above-described hardware resources. As illustrated in FIG. 5, the functional configuration of the information processing device 10 includes a vehicle information acquisition section 60, a satellite image acquisition section 62, a detection section 64, an identifying section 66, a calculation section 68, an output section 70, and a guidance section 72. Note that the respective functional configurations are implemented by the CPU 30 reading and executing programs stored in the ROM 32 or the storage 36.

The vehicle information acquisition section 60 has a function of acquiring vehicle information relating to a remaining amount of power of the vehicle 11 and the current position of the vehicle 11.

The satellite image acquisition section 62 has a function of acquiring satellite images of the periphery of the travel route of the vehicle 11. More specifically, the satellite image acquisition section 62 accesses the server 12 to acquire a satellite image, from among the satellite images stored in the server 12, corresponding to a location that is within a predetermined distance from the current position of the vehicle 11. The satellite image acquired by the satellite image acquisition section 62 is, for example, at least one of a visible image, an infrared image, a water vapor image, a cloud-top emphasized image, a true color reproduction image, or an RGB composite image. Note that the satellite image acquired by the satellite image acquisition section 62 is not limited to the periphery of the travel route of the vehicle 11, and may be of a wider range.

The detection section 64 has a function of detecting vacant charging stations, which include a vacant charger that is not being used, from among the charging stations that appear on the satellite image acquired by the satellite image acquisition section 62 and that include at least one charger for a vehicle. For example, in a charging station including a single charger, in a case in which the charger is not being used, the charging station is detected as a vacant charging station. Further, in a case in which, for example, nine chargers are being used in a charging station that includes ten chargers, but the remaining one charger is not being used, the charging station is detected as a vacant charging station. Note that as an example, whether or not the charger of each respective charging station is being used is determined based on whether or not a vehicle is parked in a parking space corresponding to each respective charger.

The identifying section 66 identifies a vacant charging station that the vehicle 11 can reach, from among the vacant charging stations detected by the detection section 64, based on the vehicle information acquired by the vehicle information acquisition section 60. Namely, the identifying section 66 calculates a distance that can be travelled by the vehicle 11 based on the remaining amount of power of the vehicle 11. Moreover, the route distance from the current position of the vehicle 11 to each respective vacant charging station is calculated. Then, the distance than can be travelled and each respective route distance are compared to identify a vacant charging station having a route distance that is less than the distance that can be travelled. At this time, the identifying section 66 may identify a vacant charging station capable of providing spare capacity for the distance that can be travelled. For example, a vacant charging station may be identified for which the route distance is less than the distance that can be travelled by 1 km or more. In this case, for example, even in a case in which the vehicle 11 is caught up in an accident, a traffic jam, or the like during route guidance, or in a case in which the vehicle 11 travels on a route that is farther away than supposed due to an error in driving operation, the likelihood of successfully reaching the target charging station can be increased. Note that a method of identifying a charging station that the vehicle 11 can reach is not limited to the above description.

The calculation section 68 calculates the number of vacant chargers at each respective vacant charging station that the vehicle 11 can reach, as identified by the identifying section 66, based on the satellite image. For example, in the two examples described above, the number of vacant chargers is one in both cases.

The output section 70 has a function of outputting the station position information of each respective vacant charging station to a display area of any one of the display area V1, the display area V2, or the display area V3 which are provided inside the vehicle cabin of the vehicle 11. The output section 70 preferentially outputs vacant charging stations with a large number of vacant chargers. For example, from among ten vacant charging stations, the three charging stations with the largest number of vacant chargers are output. As another example, from among ten vacant charging stations, the charging stations with two or more vacant chargers are output. Note that a method of selecting vacant charging stations to be output is not limited to the above description.

The guidance section 72 has a function of guiding the vehicle 11 to a vacant charging station. As an example, in a case in which the user selects a specific vacant charging station on the center display 25, the route to the selected vacant charging station is displayed at one of the display area V1, the display area V2, or the display area V3 to guide the vehicle 11. Moreover, in a case in which the user has not selected a specific vacant charging station on the center display 25 within a predetermined period of time, the route to any of the vacant charging stations that can be reached and have a large number of vacant chargers is displayed at any one of the display area V1, the display area V2, or the display area V3, and the vehicle 11 is guided. As an example, in a case in which the user has not selected a specific vacant charging station on the center display 25 within a predetermined period of time, the guidance section 72 guides the vehicle 11 to a charging station with the largest number of vacant chargers from among the vacant charging stations output by the output section 70. Note that the charging station for which guidance is provided by the guidance section 72 is not limited to this, and may be, for example, the nearest vacant charging station.

Example of Flow of Processing

Figure 6:
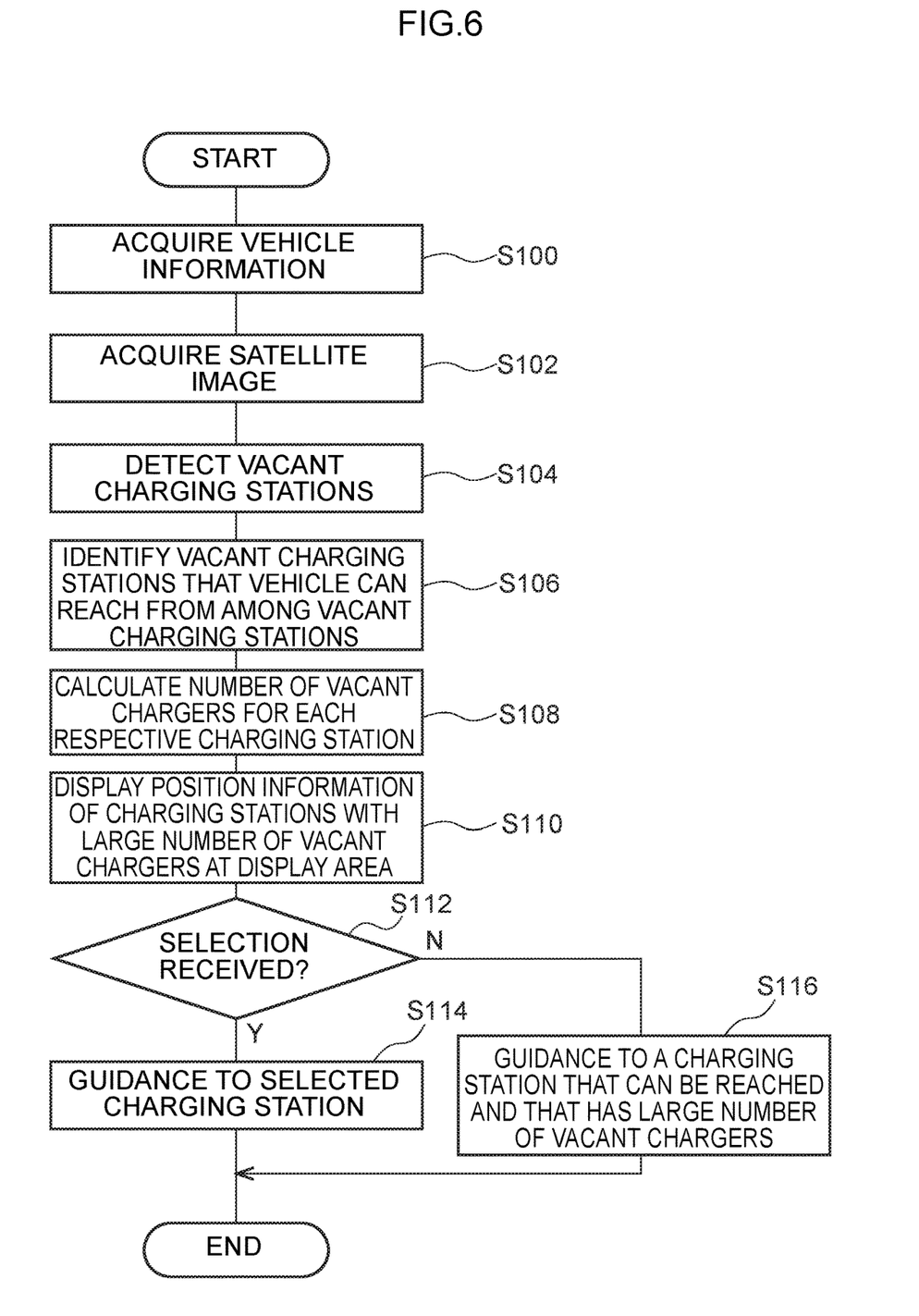
FIG. 6 is a flowchart illustrating an example of a flow of display processing executed by the CPU in FIG. 3.

As an example, explanation follows regarding a processing program that is executed by the information processing device 10 at a timing at which the user searches for a charging station via the center display 25, with reference to FIG. 6.

At step S100 in FIG. 6, the CPU 30 acquires, from the vehicle 11, vehicle information relating to the remaining amount of power of the vehicle 11 and the current position of the vehicle 11.

At step S102, the CPU 30 acquires, from the server 12, a satellite image of the periphery of the travel route of the vehicle 11.

At step S104, the CPU 30 detects, from the satellite image, vacant charging stations which have a vacant charger.

At step S106, based on the vehicle information, the CPU 30 identifies vacant charging stations that the vehicle 11 can reach from among the detected vacant charging stations.

At step S108, based on the satellite image, the CPU 30 calculates the number of vacant chargers for each respective vacant charging station, as identified by the identifying section 66, that the vehicle 11 can reach.

At step S110, the CPU 30 outputs the station position information of the vacant charging stations with a large number of vacant chargers to one of the display area V1, the display area V2, or the display area V3 which are provided inside the vehicle cabin of the vehicle 11.

At step S112, the CPU 30 determines whether or not a selection of a charging station has been received from the center display 25.

In a case in which the CPU 30 determines at step S112 that a selection of a charging station has been received, namely, in a case in which the user has selected a specific vacant charging station on the center display 25, at step S114, the CPU 30 causes display of a route to the selected vacant charging station at any one of the display area V1, the display area V2, or the display area V3 to guide the vehicle 11, and ends the processing.

On the other hand, in a case in which the CPU 30 determines at step S112 that a selection of a charging station has not been received, namely in a case in which the user has not selected a specific vacant charging station on the center display 25 within a predetermined period of time, at step S116, the CPU 30 causes display of a route to any of the vacant charging stations that can be reached and have a large number of vacant chargers at any one of the display area V1, the display area V2, or the display area V3 to guide the vehicle 11, and ends the processing.

Operation

Next, explanation follows regarding operation of the present exemplary embodiment.

The information processing system S and the information processing device 10 according to the present exemplary embodiment enable a user to understand the position of each respective charging station with a vacant charger.

Moreover, according to the information processing system S and the information processing device 10 of the present exemplary embodiment, based on vehicle information relating to the remaining amount of power of the vehicle 11 and position information of the vehicle 11, a charging station that the vehicle 11 can reach is identified from among the vacant charging stations, and the position information of the aforementioned charging station is output. This enables a situation in which the remaining amount of power of the vehicle 11 is used up before reaching the charging station to be avoided.

Moreover, according to the information processing system S and the information processing device 10 of the present exemplary embodiment, based on a satellite image, the number of vacant chargers of each respective charging station is calculated, and the position information of each respective charging station with a large number of vacant chargers is preferentially output. This enables the user to understand charging stations with a large number of vacant chargers. This thereby enables the possibility of the chargers of a charging station becoming filled while the vehicle 11 is moving to the charging station to be reduced.

Moreover, according to the information processing system S and the information processing device 10 of the present exemplary embodiment, the guidance section 72 guides the vehicle 11 to a charging station with a large number of vacant chargers. This enables the charging of plural vehicles to be geographically dispersed. As a result, power supply can be stabilized.

Moreover, according to the information processing system S and the information processing device 10 of the present exemplary embodiment, since vacant charging stations are detected based on a satellite image, the vacancy state of each charger can be understood even for a charging station without a server. This enables a larger number of vacant charging stations to be detected compared to an information processing device that detects a vacancy state from a server of the charging station.

Supplementary Explanation of the Above-Described Exemplary Embodiment

Although the vehicle 11 is a BEV in the above-described exemplary embodiment, there is no limitation thereto. For example, the vehicle may be a hybrid electric vehicle (HEV) or a plug-in hybrid electric vehicle (PHEV).

Although in the above-described exemplary embodiment, the output section 70 has been described as outputting position information of each respective vacant charging station to any one of the display area V1, the display area V2, or the display area V3 of the vehicle 11, there is no limitation thereto. For example, the output section 70 may output the position information of each respective vacant charging station to a terminal possessed by the user. Further, the vehicle information acquisition section 60 may acquire vehicle information from the terminal of the user.

Moreover, in the above-described exemplary embodiment, although the calculation section 68 has been described as calculating the number of vacant chargers of each respective vacant charging station, and the output section 70 preferentially outputting vacant charging stations with a large number of vacant chargers, there is no limitation thereto. For example, the information processing device 10 may not include a calculation section. In this case, the station position information of all the vacant charging stations that the vehicle 11 can reach is output. This enables the user to obtain more options for vacant charging stations.

Moreover, for example, the output section 70 of the information processing device 10 may output a public charging station, from among the vacant charging stations, preferentially to a privately owned charging station. In this case, the user can charge the vehicle 11 using a charger that is capable of rapid charging, thereby enabling the charging time period to be shortened.

Conversely, the output section 70 of the information processing device 10 may output a privately owned charging station, from among the vacant charging stations, preferentially to a public charging station. This facilitates the use of the privately owned charging station. This enables charging to be geographically dispersed, thereby enabling power supply to be stabilized.

Moreover, in a case in which a privately owned charging station is used, the information processing device 10 may give an incentive to the owner of the private charging station. Regardless of the usage history of the privately owned charging station, the owner may be given an incentive in a case in which the owner permits sharing of his/her charging station, namely releasing his/her charging station to the public. This thereby facilitates the installation and sharing of privately owned charging stations.

Moreover, the information processing device 10 may pay an incentive to a user who uses a privately owned charging station. This further promotes the use of privately owned charging stations.

These incentives may be paid as a reward or may be in the form of allowing the host vehicle to be charged at a low price when charging at a public charging station.

Although in the above-described exemplary embodiment, the guidance section 72 has been described as guiding the vehicle 11 to the selected vacant charging station in a case in which the user has selected a specific vacant charging station on the center display 25, there is no limitation thereto. For example, the guidance section 72 may automatically guide the vehicle 11 to any of the vacant charging stations without providing the user with an opportunity to make a selection. The selection criteria of the charging station for which the guidance section 72 provides guidance may adopt various criterion such as proximity of distance, a large number of vacant chargers, public or private ownership, or low utilization. The utilization rate referred to herein can be, for example, a ratio of the number of the chargers that are being used from among all of the chargers of each respective charging station. The method of calculating the utilization rate is not limited to this, and for example, the utilization rate may be calculated as a frequency of use by continuously acquiring satellite images.

Although in the above-described exemplary embodiment, the information processing program illustrated in FIG. 6 has been described as being executed at a timing at which a charging station has been searched for by a user via the center display 25, there is no limitation thereto. For example, the information processing device 10 may acquire vehicle information from the vehicle at predetermined time intervals, and execute the information processing program illustrated in FIG. 6 at a timing at which the remaining amount of power has dropped below a predetermined amount.

What is claimed is:

1. An information processing device comprising a processor, wherein the processor is configured to:
   acquire a satellite image from an artificial satellite;
   detect, among charging stations within the satellite image that include at least one charger for a vehicle, vacant charging stations having a vacant charger that is not being used; and
   output station position information related to a position of each respective detected vacant charging station.

2. The information processing device according to claim 1, wherein the processor is configured to:
   acquire vehicle information relating to a remaining amount of power of a vehicle and a position of the vehicle;
   based on the vehicle information, identify a vacant charging station that the vehicle can reach, among the vacant charging stations; and
   output station position information related to the identified vacant charging station.

3. The information processing device according to claim 2, wherein the processor is configured to:
   based on the satellite image, calculate a number of vacant chargers included at each respective vacant charging station; and
   output station position information related to each of a predetermined number of vacant charging stations that have a largest or next largest number of vacant chargers.

4. The information processing device according to claim 2, wherein the processor is configured to:
   based on the satellite image, calculate a number of vacant chargers included at each respective vacant charging station; and
   output station position information related to each of the vacant charging stations that have at least a predetermined number of vacant chargers.

5. The information processing device according to claim 3, wherein the processor is configured to:
   guide the vehicle to a vacant charging station having a largest number of vacant chargers.

6. An information processing system comprising:
   a vehicle that includes a display area inside a vehicle cabin; and
   the vehicle information processing device according to claim 1, which detects the vacant charging stations with a vacant charger from the satellite image that is captured by the artificial satellite, and which causes display of the station position information related to the position of each respective vacant charging station at the display area of the vehicle.

7. An information processing method comprising executing, by a processor, processing comprising:
   acquiring a satellite image from an artificial satellite;
   detecting, among charging stations within the satellite image that include at least one charger for a vehicle, vacant charging stations having a vacant charger that is not being used; and
   outputting station position information related to a position of each respective detected vacant charging station.

8. A non-transitory storage medium storing a program that is executable by a computer to perform processing, the processing comprising:
   acquiring a satellite image from an artificial satellite;
   detecting, among charging stations within the satellite image that include at least one charger for a vehicle, vacant charging stations having a vacant charger that is not being used; and
   outputting station position information related to a position of each respective detected vacant charging station.

9. The information processing device according to claim 2, wherein the processor is configured to:
   based on the vehicle information, calculate a distance that can be travelled by the vehicle and a route distance from a current location of the vehicle to each respective vacant charging station;
   compare the distance that can be travelled by the vehicle with each route distance; and
   identify a vacant charging station with a route distance that is less than the distance that can be travelled by the vehicle, as the vacant charging station that the vehicle can reach.

10. The information processing device according to claim 2, wherein the processor is configured to:
    output station position information for all vacant charging stations that the vehicle can reach.

11. The information processing device according to claim 1, wherein the processor is configured to:
    among the vacant charging stations, output information related to a public charging station preferentially to a privately owned charging station.

12. The information processing device according to claim 1, wherein the processor is configured to:
    among the vacant charging stations, output information related to a privately owned charging station preferentially to a public charging station.

13. The information processing device according to claim 12, wherein the processor is configured to:
    in a case in which the privately owned charging station is used, provide an incentive to an owner of the privately owned charging station.

14. The information processing device according to claim 12, wherein the processor is configured to:

provide an incentive to a user who uses the privately owned charging station.

* * * * *